United States Patent
Mori

(10) Patent No.: US 7,724,544 B2
(45) Date of Patent: May 25, 2010

(54) AC POWER SUPPLY APPARATUS

(76) Inventor: Eiichi Mori, c/o Fujitsu Limited, 1-1, Kamikodanaka 4-chome, Nakahara-ku, Kawasaki-shi, Kanagawa 211-8588 (JP)

( * ) Notice: Subject to any disclaimer, the term of this patent is extended or adjusted under 35 U.S.C. 154(b) by 0 days.

(21) Appl. No.: 11/863,636

(22) Filed: Sep. 28, 2007

(65) Prior Publication Data

US 2008/0013344 A1    Jan. 17, 2008

Related U.S. Application Data

(63) Continuation of application No. PCT/JP2005/006314, filed on Mar. 31, 2005.

(51) Int. Cl.
*H02M 3/335* (2006.01)
(52) U.S. Cl. .......................... 363/18; 363/16
(58) Field of Classification Search .................. 363/18, 363/16, 17, 25, 24, 164, 22, 23, 21.01, 21.02; 331/109, 10, 102, 114, 107, 16, 48; 315/38
See application file for complete search history.

(56) References Cited

U.S. PATENT DOCUMENTS

| | | | | |
|---|---|---|---|---|
| 3,495,186 | A * | 2/1970 | Wright | 331/109 |
| 4,210,858 | A * | 7/1980 | Ford et al. | 323/247 |
| 4,920,302 | A * | 4/1990 | Konopka | 315/307 |
| 5,422,605 | A * | 6/1995 | Yang et al. | 331/116 R |
| 5,517,089 | A * | 5/1996 | Ravid | 315/307 |
| 5,923,546 | A * | 7/1999 | Shimada et al. | 363/40 |
| 2002/0121865 | A1 | 9/2002 | Nakatsuka et al. | |
| 2004/0100592 | A1 | 5/2004 | Nakanishi et al. | |
| 2007/0090775 | A1 * | 4/2007 | Ribarich | 315/291 |
| 2007/0171154 | A1 * | 7/2007 | Collins et al. | 345/76 |

FOREIGN PATENT DOCUMENTS

| | | |
|---|---|---|
| JP | 5-198384 | 8/1993 |
| JP | 7-153589 | 6/1995 |
| JP | 10-200174 | 7/1998 |
| JP | 11-26181 | 1/1999 |
| JP | 11-122937 | 4/1999 |
| JP | 2000-228295 A | 8/2000 |
| JP | 2001-196196 | 7/2001 |
| JP | 2001-319794 A | 11/2001 |
| JP | 2002-100496 | 4/2002 |

(Continued)

OTHER PUBLICATIONS

English language version of the International Search Report (PCT/ISA/210) of the International Application PCT/JP2005/006314 (mailed on May 31, 2005).

(Continued)

*Primary Examiner*—Matthew V. Nguyen
*Assistant Examiner*—Nguyen Tran

(57) ABSTRACT

An AC power supply apparatus used for an AC load of a high voltage such as a cold cathode tube. When a cold cathode tube is caused to emit a light, a DC voltage is on/off controlled at a predetermined ratio; thereafter, an AC signal of a high frequency is applied to the on/off controlled voltage in an oscillator circuit; then the resultant signal is boosted up to a predetermined level of voltage in a booster circuit; and thereafter, the AC power supply of the high voltage is applied to the load such as the cold cathode tube.

15 Claims, 10 Drawing Sheets

FOREIGN PATENT DOCUMENTS

| | | |
|---|---|---|
| JP | 2002-343595 | 11/2002 |
| JP | 2003-257694 | 9/2003 |
| KR | 1998-018927 | 6/1998 |

OTHER PUBLICATIONS

"Chinese Office Action", mailed Nov. 14, 2009. Partial English Translation.

"Republic of Korea Office Action", Partial English-language translation, mailed Aug 7, 2009 from KR Patent Office for corresponding KR App. No. 10-2007-7021109.

Official Action mailed by the Japanese Patent Office on Jan. 19, 2010, in connection with JP 2007-512383 (a related application). Partial English-language translation.

\* cited by examiner

F I G. 2A
F I G. 2B
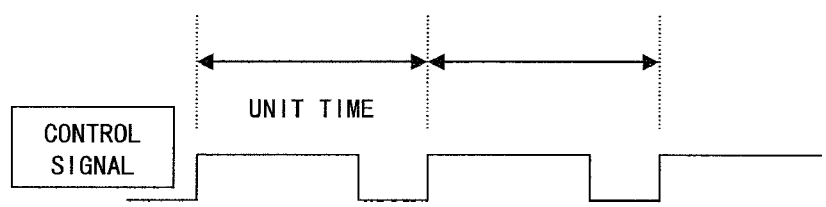

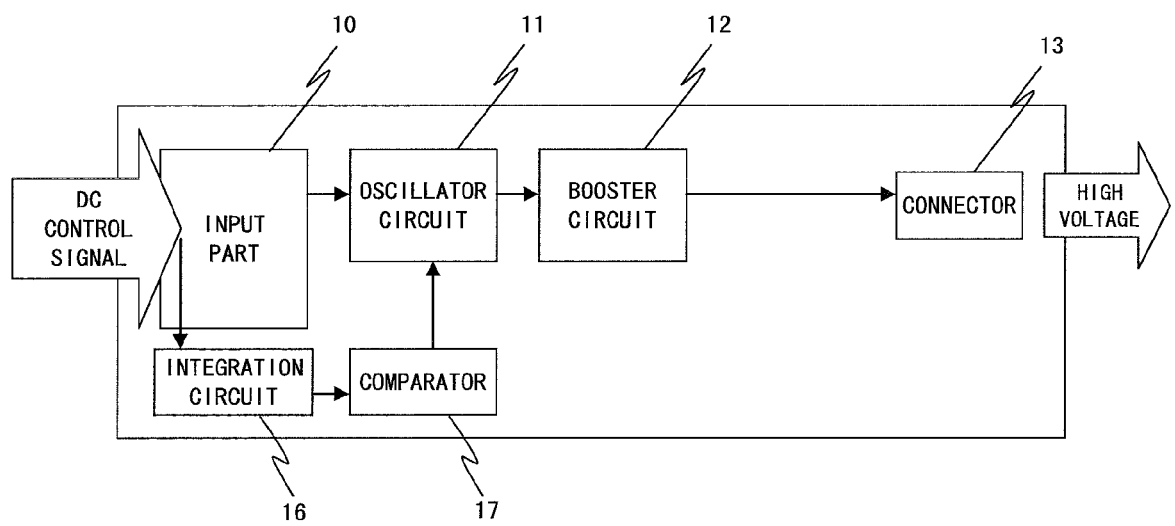
F I G. 5

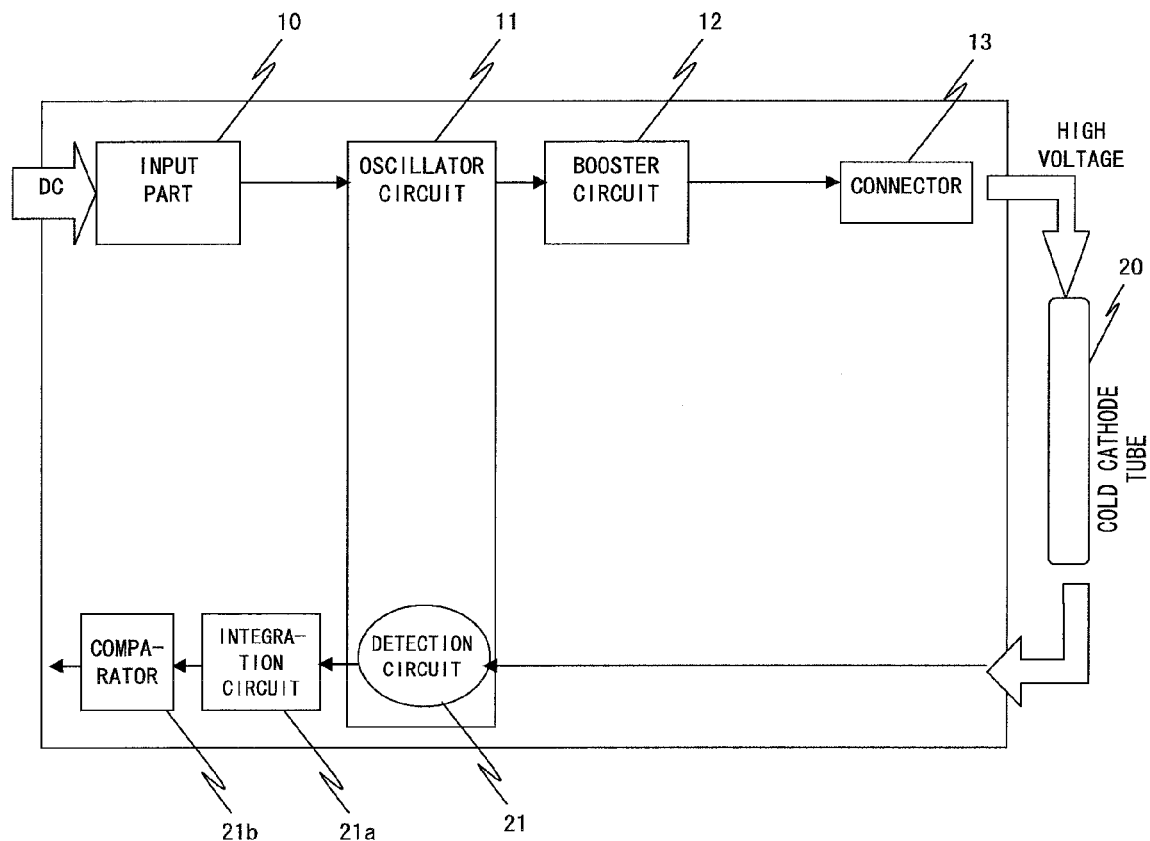
F I G. 7

AC POWER SUPPLY APPARATUS

CROSS REFERENCE TO RELATED APPLICATION

This application is a continuation application of International PCT Application No. PCT/JP2005/006314 which was filed on Mar. 31, 2005.

BACKGROUND OF THE INVENTION

1. Field of the Invention

The present invention relates to an AC power supply apparatus for use in applying a load to a cold cathode tube etc.

2. Description of the Related Art

Recently, a cold cathode tube is widely used as a light source for an LCD (liquid crystal display) unit etc. The adjustment of the amount of light of the cold cathode tube is performed depending on the amount of a current caused to flow through the cold cathode tube. Therefore, when there is a large amount of a current, it is bright and the power consumption is high. When there is a small amount of a current, it is dark and the power consumption can be low.

FIG. 9 shows a conventional AC power supply apparatus of a cold cathode tube in which a control signal is supplied together with a DC voltage to an input part 1, and the DC voltage is on/off controlled according to the control signal, thereby generating input power supply. An oscillator circuit 2 oscillates the power supply provided from the input part 1 at an AC frequency, boosts the voltage up to a predetermined voltage (for example, 600 V) by a booster circuit 3 configured by, for example, a transformer, and provides the result to a cold cathode tube through a connector 4.

Relating to the above-mentioned AC power supply apparatus, FIG. 10A shows a power supply waveform supplied from the input part 1 to the oscillator circuit 2. According to the control signal, the on/off control is performed every unit time, the ratio is controlled, and power is supplied to the oscillator circuit 2 on the basis of the ratio. The waveform shown in FIG. 10B is an output waveform of the oscillator circuit 2 to which an AC frequency is assigned by the oscillator circuit 2 in an energized period. The higher the frequency is, the higher the AC frequency tends to be in brightness.

As described above, with the conventional AC power supply apparatus, the energized/nonenergized time ratio shown in FIG. 10A is controlled, the current supplied to the cold cathode tube is varied, and the light modulation of the cold cathode tube is controlled.

However, in a notebook computer recently used in an LCD unit, a PDA (personal digital assistants), etc., the brightness of the display is controlled during, for example, transportation etc. such that it can be dark to reduce the power consumption. In this case, the energized period shown in FIG. 10A is controlled such that the period can be shorter. Although it is preferable that a high frequency is used with the brightness during use taken into account, a leakage current occurs in a cold cathode tube in this case if the energized period is shortened at a high frequency, and one end of the cold cathode tube becomes dark.

The patent document 1 discloses an invention of preventing a leakage current in the lighting circuit of a cold cathode tube used as a backlight of a liquid crystal display.

Patent Document 1: Japanese Published Patent Application No. H10-200174

SUMMARY OF THE INVENTION

The objective of the present invention is to provide an AC power supply apparatus capable of driving an AC load of a cold cathode tube etc. using a high frequency as an AC frequency, preventing light emission of nonuniform load such as a cold cathode tube by a leakage current while deriving brightness although the current is reduced, thereby preventing degradation of display quality.

According to the AC power supply apparatus of the present invention, the above-mentioned objective can be attained by providing an AC power supply apparatus including: an input device for performing on/off control of a DC power supply in a unit time on an amount of current caused to flow through a load; an oscillation device for oscillation at a high AC frequency in an energized period of the DC power supply when a supplied amount of current to the predetermined load is a predetermined level or more, and for oscillation at a low AC frequency in an energized period of the DC power supply when a supplied amount of current to the predetermined load is less than a predetermined level; and an output device of a high voltage for boosting the output of the oscillation device and supplying the result to the load.

According to the AC power supply apparatus of the present invention, the above-mentioned objective can also be attained by providing an AC power supply apparatus for switching the AC frequency from a high frequency to a low frequency on the basis of the integration value of the control signal for control of the on/off ratio of the DC power supply.

According to the AC power supply apparatus of the present invention, the above-mentioned objective can also be attained by providing an AC power supply apparatus for switching the AC frequency from a high frequency to a low frequency on the basis of the differentiation value of the control signal for control of the on/off ratio of the DC power supply.

According to the AC power supply apparatus of the present invention, the above-mentioned objective can also be attained by providing an AC power supply apparatus for switching the AC frequency from a high frequency to a low frequency on the basis of a feedback current fed back through the load.

BRIEF DESCRIPTION OF DRAWINGS

FIG. 2A shows a DC voltage supplied to the input part;

FIG. 2B shows a control signal;

FIG. 5 is a block diagram of the circuit of the AC power supply apparatus for explanation of the mode 2 for embodying the present invention;

FIG. 7 is a block diagram of the circuit of the AC power supply apparatus for explanation of the mode 4 for embodying the present invention;

DESCRIPTION OF THE PREFERRED EMBODIMENTS

The modes for embodying the present invention are described below in detail by referring to the attached drawings.

Mode 1 for embodying the present invention

Figure 1:
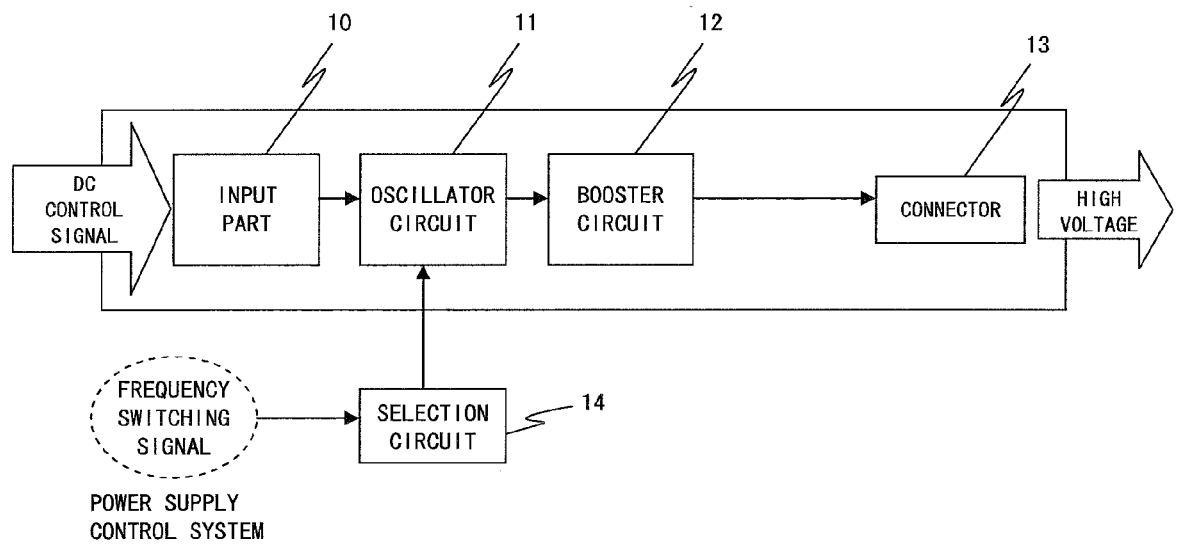
FIG. 1 is a block diagram of the AC power supply apparatus for explanation of the mode 1 for embodying the present invention.

FIG. 1 is a block diagram of the circuit of the AC power supply apparatus according to the mode for embodying the present invention.

In FIG. 1, the apparatus is configured by an input part 10, an oscillator circuit 11, a booster circuit 12, a connector 13, and a selection circuit 14. A frequency switching signal is provided from the power supply control system not shown in the attached drawings to the selection circuit 14.

A DC voltage and a control signal are provided for the input part 10. FIG. 2A shows a DC voltage supplied to the input part 10, and FIG. 2B is a timing chart of a control signal. The voltage value (V) of a DC voltage has potential of, for example, 5V, 12V, 24V, etc. The control signal is an on/off ratio signal according to light modulation information, a DC voltage is turned on and off at the ratio, and an input power supply is generated.

The oscillator circuit 11 selects an AC frequency according to the selection signal supplied from the selection circuit 14, and oscillates a selected AC frequency in the energized period of the power supply output from the input part 10. In this case, the frequency switching signal output from the power supply control system to the selection circuit 14 is a signal at a light modulation level set in advance by the feature of the cold cathode tube, an available voltage, etc.

For example, the light modulation level is set in 10 steps from the minimum brightness (step 1) to the maximum brightness (step 10) for control. In this case, if the degradation of the display quality by a high AC frequency is detected only in the first step, the selection circuit 14 is allowed to select a high AC frequency at the light modulation level in advance in the second through tenth steps, and to select a low AC frequency only in the first step.

Figure 3:
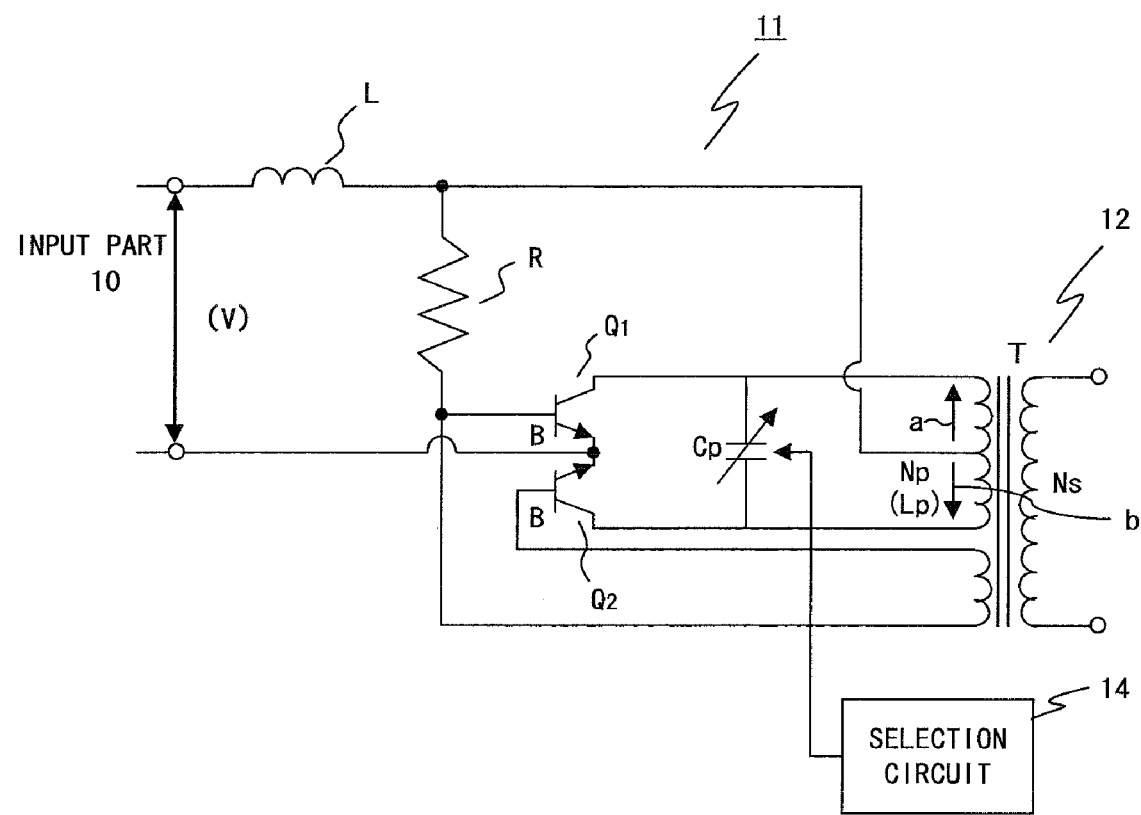
FIG. 3 shows a circuit as a practical example of the oscillator circuit.

The oscillator circuit 11 oscillates the AC frequency selected by the selection circuit 14. For example, FIG. 3 shows a practical circuit of the oscillator circuit 11, and includes the booster circuit 12. In FIG. 3, switching transistors (hereinafter referred to simply as transistors) Q1 and Q2 perform alternate switching according to a drive signal provided for the base (B), oscillate an AC frequency, and refer to what is called a push-pull voltage oscillator circuit. The transformer T shown in FIG. 3 is the above-mentioned booster circuit 12, and boosts an input voltage on the basis of the coil ratio Ns/Np.

A parallel resonant circuit of a resonant capacitor Cp and a composite impedance Lp at the primary side of the transformer T determines an AC frequency. Therefore, according to the output of the selection circuit 14, for example, the capacity of the resonant capacitor Cp is varied, and the oscillator circuit 11 is caused to oscillate a high frequency or a low frequency.

Figure 4:
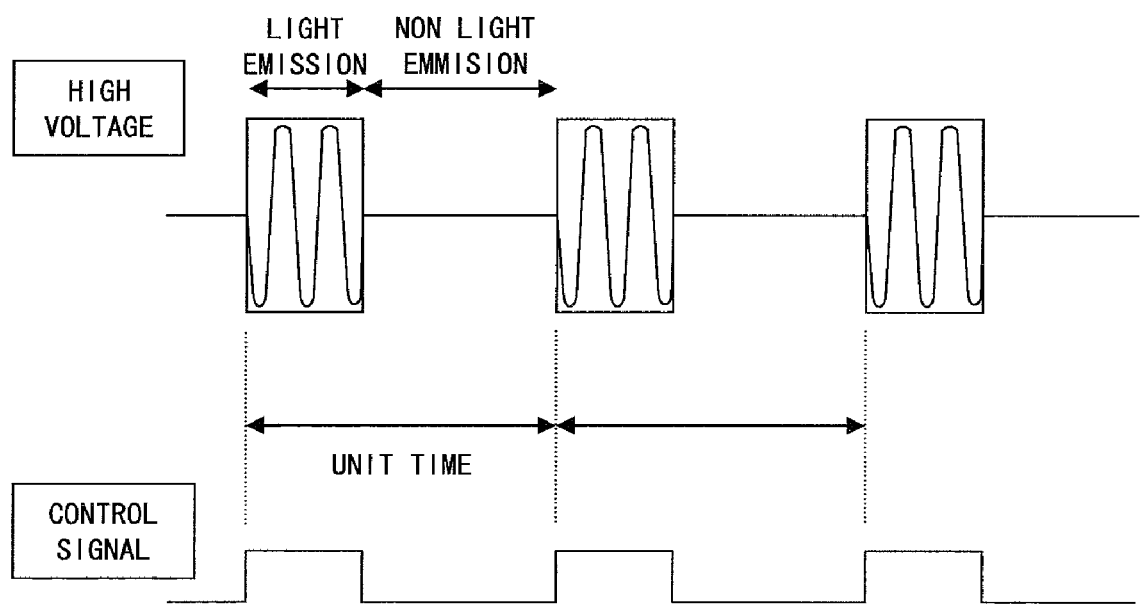
FIG. 4 shows the output waveform of an AC high voltage to be supplied to a control signal and a cold cathode tube.

That is, when a voltage (V) is supplied from the input part 10 to the oscillator circuit 11 in the energized period, a drive signal is supplied to the transistor Q1 through the coil L and the pull-up resistance R, thereby turning on the transistor Q1. By driving the transistor Q1, a current flows in the direction of the arrow a on the primary side of the transformer T, a drive signal is supplied by the base coil of the transformer T at the base (B) of the transistor Q2, then the transistor Q2 is turned on, and a current flows in the direction of the arrow b on the primary side of the transformer T. Thus, by repeating the above-mentioned driving process, the frequency selected by the selection circuit 14 from the output of the oscillator circuit 11 is oscillated. FIG. 4 shows the output timing of the low frequency drive power supply of a high voltage to be supplied to a cold cathode tube according to the above-mentioned control signal.

Therefore, in the above-mentioned light modulation levels 2 through 10, for example, a high frequency of 100 KHz is oscillated for bright light emission of a cold cathode tube while reducing the light emission of the cold cathode tube at the light modulation level of, for example, 1 to prevent nonuniform light emission of the cold cathode tube by a leakage current by the low frequency oscillation of, for example, 50 KHz. With the configuration, the display quality of the LCD unit provided with a cold cathode tube can be prevented from being degraded.

In the example above, the light modulation is performed at 10 levels, and the AC frequency is set as a low frequency only at the light modulation level 1, but the AC frequency can also be set as a low frequency at the light modulation level 2 or less depending on the characteristic of an available cold cathode tube, an available voltage, etc., and the light modulation level 3 or less can also be set.

In the example above, the AC frequency can be in two stages of the high frequency of 100 KHz and the low frequency of 50 KHz, but the capacity of the above-mentioned resonant capacitor can be controlled for more detailed control in three stages, four stages, etc.

Mode 2 for embodying the present invention

The mode 2 for embodying the present invention is described below.

The mode has the configuration in which an AC frequency is set according to the control signal supplied to the input part. It is practically described below by referring to FIG. 5.

As described above, a DC voltage and a control signal are provided for the input part 10, and the input power supply on/off controlled according to the control signal is used by the oscillator circuit 11 oscillating a high frequency or a low frequency, and output to the booster circuit 12. In the present mode, an integration circuit 16 and a comparator 17 are used. The integration circuit 16 integrates a control signal for on/off control, and outputs the result of the integration to the comparator 17.

If the integration value is lower than a predetermined value, the comparator 17 transmits a switch signal to the oscillator circuit 11, and switches the oscillation frequency of the oscillator circuit 11 from a high frequency to a low frequency. In the present mode, the circuit shown in FIG. 3 can be applied to the oscillator circuit 11, and the oscillator circuit 11 varies the capacity of the resonant capacitor Cp by the output of the comparator 17, and switches the AC frequency of the oscillator circuit 11 to a low frequency.

Therefore, the on-state ratio of the control signal becomes low. For example, when it reaches an on/off ratio corresponding to the light modulation level 1, the AC frequency of the oscillator circuit 11 is switched to a low frequency, thereby preventing nonuniform light emission of a cold cathode tube by a leakage current, and, for example, suppressing the degradation of the display quality of the LCD unit for which the cold cathode tube is provided.

Mode 3 for embodying the present invention

Described below is the mode 3 for embodying the present invention.

Figure 6:
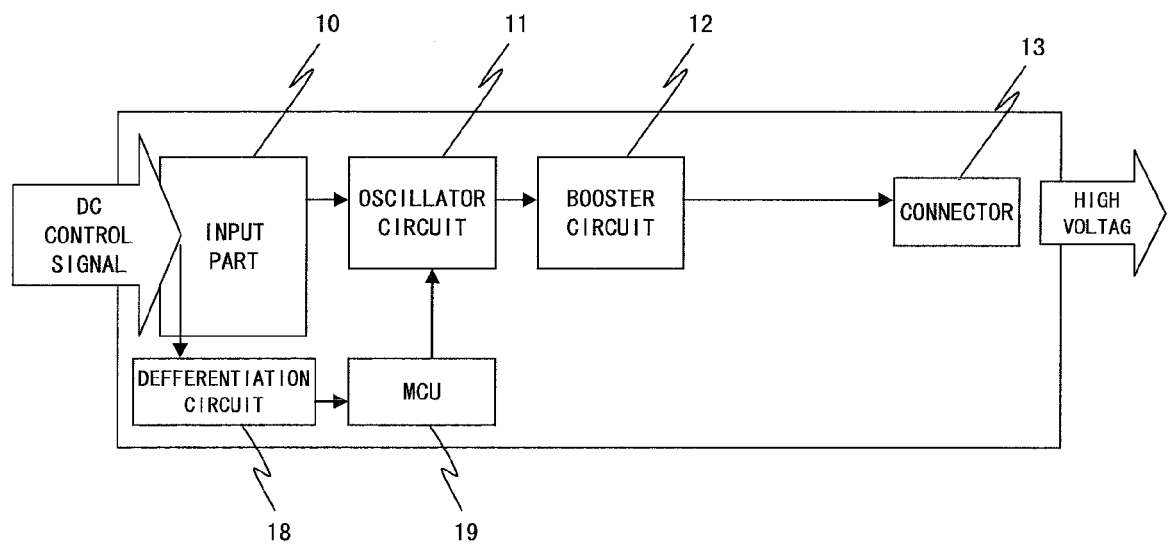
FIG. 6 is a block diagram of the circuit of the AC power supply apparatus for explanation of the mode 3 for embodying the present invention.

This mode refers to a configuration in which an AC frequency is set as a low frequency on a basis of a variation of a control signal supplied to the input part. It is practically described below by referring to FIG. 6.

As described above, a DC voltage and a control signal are supplied to the input part 10. The control signal is used in performing on/off control according to the light modulation information in each unit time to generate input power supply. The control signal used in this mode is different from those used in the above-mentioned modes, and the frequency changes depending on the on/off ratio. For example, if an energized period is short, the output frequency of a control signal is high.

A differentiation circuit 18 differentiates the control signal with the above-mentioned configuration, and outputs a result of the differentiation to a MCU (micro-controller unit) 19. If the result of the differentiation exceeds a predetermined value, the MCU 19 transmits a control signal to the oscillator circuit 11, and switches the oscillation frequency of the oscillator circuit 11 from a high frequency to a low frequency. Also in this mode, the oscillator circuit 11 can utilize the circuit shown in FIG. 3. The capacity of the resonant capacitor Cp is varied depending on the output of the MCU 19, and the AC frequency of the oscillator circuit 11 can be set at a low frequency.

For example, when the frequency of the control signal becomes high and reaches the frequency corresponding to the above-mentioned light modulation level 1 the AC frequency of the oscillator circuit 11 can be switched to a low frequency, thereby preventing nonuniform light emission of a cold cathode tube by a leakage current, and, for example, suppressing the degradation of the display quality of the LCD unit for which the cold cathode tube is provided.

Mode 4 for embodying the present invention

Described below is the mode 4 for embodying the present invention.

The present mode has a configuration in which an AC frequency is varied on a basis of a current fed back through a cold cathode tube. It is practically described below.

FIG. 7 is a block diagram of the circuit of the AC power supply apparatus according to the present mode for embodying the present invention. As described above, a DC voltage and a control signal are supplied to the input part 10, the control signal on/off controls the DC voltage in each unit time, and power is supplied to the oscillator circuit 11. The oscillator circuit 11 performs oscillation according to a specified AC frequency, and supplies a high voltage to a cold cathode tube 20 through the connector 13 for light emission of the cold cathode tube 20.

A detection circuit 21 detects a feedback current of the cold cathode tube 20. The detection circuit 21 is configured by, for example, an integration circuit 21a and a comparator 21b. The integration circuit 21a integrates the feedback current supplied through the cold cathode tube 20, and outputs a result of integration to the comparator 21b.

The feedback current supplied to the integration circuit 21a is proportional to the amount of current flowing through the cold cathode tube 20. When the integration value reaches a predetermined value or lower, a control signal is output to the oscillator circuit 11 to prevent nonuniform emission of the cold cathode tube 20.

Figure 8:
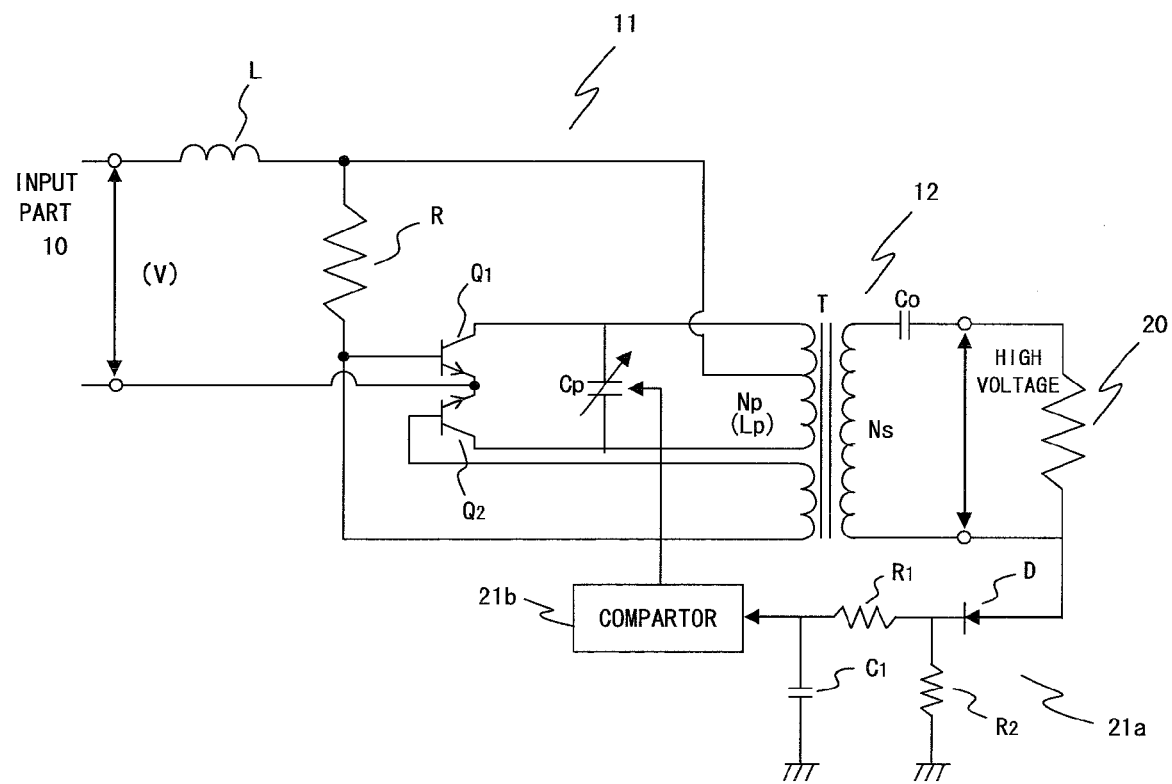
FIG. 8 shows an example of a practical circuit according to the mode 4 for embodying the present invention.
Figure 9:
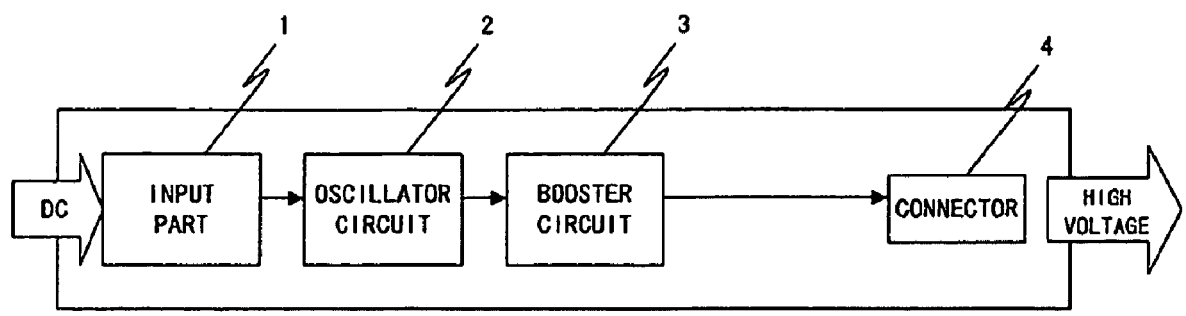
FIG. 9 is a block diagram of the circuit of the AC power supply apparatus for explanation of the conventional power supply apparatus of a cold cathode tube.
Figure 10A:
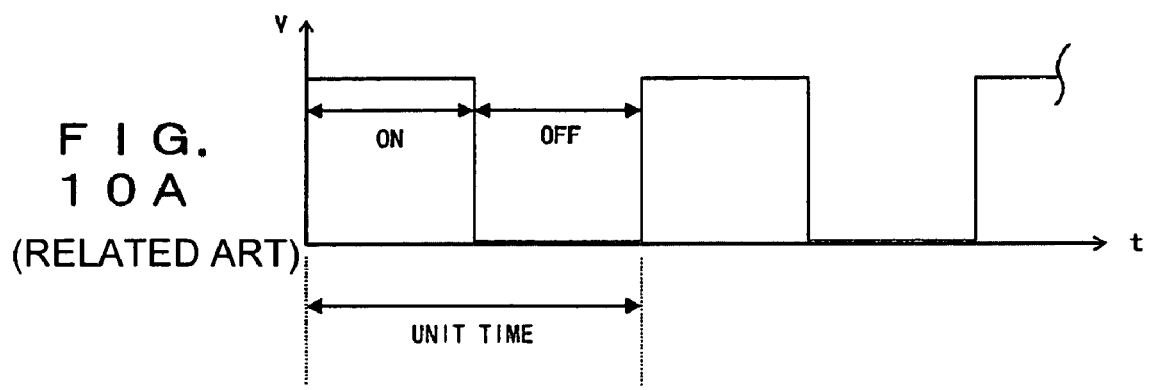
FIG. 10A shows a control signal.
Figure 10B:
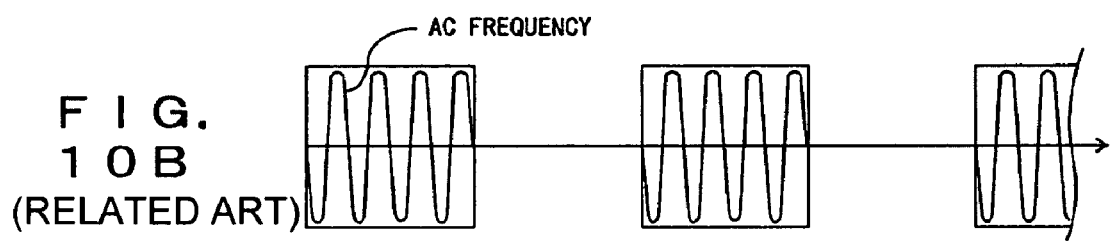
FIG. 10B shows an output waveform of the oscillator circuit.

FIG. 8 shows a practical circuit of the AC power supply apparatus according to the present mode for embodying the present invention. In FIG. 8, the configuration of the oscillator circuit 11 is the same as those described above, and the detailed description is omitted here. The integration circuit 21a is configured by a resistor R1 and a capacitor C1, and the feedback current from the cold cathode tube 20 is provided for the integration circuit 21a through a diode D. A current flows to the integration circuit 21a after the resistance of the current is divided by a division resistor R2, and a result of integration is output to the comparator 21b on the basis of a time constant depending on the values of the C1 and the R1.

The result is output to the comparator 21b, a control signal is output from the comparator 21b to the oscillator circuit 11 when, for example, a value corresponding to the predetermined light modulation level 1 is reached, the capacity of the resonant capacitor Cp is varied, and the oscillation frequency of the oscillator circuit 11 is switched from a high frequency to a low frequency. Therefore, the present mode can also prevent nonuniform light emission of a cold cathode tube by a leakage current, and suppress, for example, the degradation of the display quality of the LCD unit for which the cold cathode tube is provided.

Although the comparator 21b is used in the above-mentioned mode, the comparator 21b can be omitted by setting the above-mentioned time constant to a value corresponding to the above-mentioned light modulation level 1, a control signal can be output from the integration circuit 21a to the oscillator circuit 11, and the capacity of the resonant capacitor Cp can be varied, thereby switching the oscillation frequency of the oscillator circuit 11 from a high frequency to a low frequency.

Furthermore, the light modulation level 1 is used in the above-mentioned mode, the light modulation level 2 etc. can also be used depending on the characteristic of an available cold cathode tube, voltage, etc.

What is claimed is:

1. An AC power supply apparatus, comprising:
   an input device to perform on/off control of a DC power supply in a unit time on an amount of current caused to flow through a load, the amount of current includes a first predetermined amount of current and a second predetermined amount of current;
   an oscillation device to provide oscillation at a high AC frequency in an energized period of the DC power supply in a case where the amount of current to the load is set to the first predetermined amount of current and to provide oscillation at a low AC frequency in an energized period of the DC power supply in a case where the amount of current to the load is set to the second predetermined amount of current; and
   an output device of a high voltage to boost output of the oscillation device and to supply the boosted output to the load; and
   wherein when a light modulation level of the load corresponding to the second predetermined amount of the supplied amount of current is set in advance and the light modulation level is reached, an oscillate instruction is issued to the oscillation device.

2. The apparatus according to claim 1, wherein the oscillation device is a push-pull voltage oscillator circuit including a resonant capacitor, and the oscillate instruction at a low frequency is to vary a capacity of the resonant capacitor.

3. The apparatus according to claim 1, wherein the AC frequency is switched from a high frequency to a low frequency on a basis of an integration value of a control signal for control of an on/off ratio of the DC power supply.

4. The apparatus according to claim 3, wherein an integration value corresponding to the supplied amount of current at the second amount is stored in advance, and when the integration value of the control signal reaches or falls below the integration value stored in advance, the AC frequency is switched from a high frequency to a low frequency.

5. The apparatus according to claim 4, wherein the oscillation device is a push-pull voltage oscillator circuit including a resonant capacitor, and a switch instruction to the low frequency is to vary a capacity of the resonant capacitor.

6. The apparatus according to claim 1, wherein the AC frequency is switched from a high frequency to a low frequency on a basis of a differentiation value of a control signal for control of an on/off ratio of the DC power supply.

7. The apparatus according to claim 6, wherein a differentiation value corresponding to the supplied amount of current at the second amount is stored in advance, and when the differentiation value of the control signal reaches of exceeds the differentiation value stored in advance, the AC frequency is switched from a high frequency to a low frequency.

8. The apparatus according to claim 7, wherein the oscillation device is a push-pull voltage oscillator circuit including a resonant capacitor, and a switch instruction to the low frequency is to vary a capacity of the resonant capacitor.

9. The apparatus according to claim 1, wherein the AC frequency is switched from a high frequency to a low frequency on a basis of a feedback current fed back through the load.

10. The apparatus according to claim 9, wherein an integration circuit detects an amount of feedback current, and when the feedback current exceeds a predetermined value, a switch instruction to the low frequency is issued.

11. The apparatus according to claim 10, wherein the oscillation device is a push-pull voltage oscillator circuit including a resonant capacitor, and a switch instruction to the low frequency is to vary a capacity of the resonant capacitor.

12. The apparatus according to claim 1, wherein the load is a cold cathode tube.

13. An AC power supply apparatus, comprising:
an input device to perform on/off control of a DC power supply in a unit time on an amount of current caused to flow through a load;
an oscillation device to provide oscillation at a high AC frequency in an energized period of the DC power supply when a light modulation level which is set in plural predetermined levels according to a supplied amount of current to the predetermined load is a first predetermined level or more, and to provide oscillation at a low AC frequency in an energized period of the DC power supply when the light modulation level is less than a predetermined level; and
an output device of a high voltage for boosting output of the oscillation device and supplying the boosted output to the load; and
wherein when a light modulation level of the load corresponding to a second predetermined level of the supplied amount of current is set in advance and the light modulation level is reached, an oscillate instruction is issued to the oscillation device.

14. A display unit, comprising:
a light source; and
a power supply apparatus,
wherein the power supply apparatus comprises:
an input device to perform on/off control of a DC power supply in a unit time on an amount of current caused to flow through the light source, the amount of current includes a first predetermined amount of current and a second predetermined amount of current;
an oscillation device to provide oscillation at a high AC frequency in an energized period of the DC power supply in the case where the amount of current to the light source is set to the first predetermined amount of current, and to provide oscillation at a low AC frequency in an energized period of the DC power supply in the case where the amount of current to the light source is set to the second predetermined amount of current; and
an output device of a high voltage to boost output of the oscillation device and supplying the boosted output to the light source; and
wherein when a light modulation level of the load corresponding to the second predetermined amount of the supplied amount of current is set in advance and the light modulation level is reached, an oscillate instruction is issued to the oscillation device.

15. A display unit, comprising:
a light source; and
a power supply apparatus,
wherein the power supply apparatus comprises:
an input device to perform on/off control of a DC power supply in a unit time on an amount of current caused to flow through the light source;
an oscillation device to provide oscillation at a high AC frequency in an energized period of the DC power supply once a light modulation level which is set in plural predetermined levels according to a supplied amount of current to the light source is a first predetermined level or more, and to provide oscillation at a low AC frequency in an energized period of the DC power supply once the light modulation level is less than a predetermined level; and
an output device of a high voltage to boost an output of the oscillation device and to supply the boosted output to the light source; and
wherein when a light modulation level of the load corresponding to a second predetermined level of the supplied amount of current is set in advance and the light modulation level is reached, an oscillate instruction is issued to the oscillation device.

* * * * *